3,125,609
PURIFICATION OF VINYL CHLORIDE
Phillip D. Montgomery, Texas City, Tex., assignor to Monsanto Chemical Company, St. Louis, Mo., a corporation of Delaware
No Drawing. Filed Dec. 23, 1960, Ser. No. 77,785
4 Claims. (Cl. 260—656)

The present invention relates to a method for purifying vinyl chloride and, more particularly, to a method for removing minor amounts of butadiene from vinyl chloride.

As is well known, vinyl chloride, a monomer of considerable commercial importance, is produced by the addition reaction of acetylene and hydrogen chloride in the presence of suitable catalysts. The acetylene employed if derived from hydrocarbons usually contains minor quantities of contaminants among which is butadiene. This diolefin impurity is carried through the system and the vinyl chloride product recovered from such processes thus contains minor amounts of butadiene, i.e., amounts up to about 200 parts per million, because butadiene is not separable from vinyl chloride by the usual distillation techniques used for obtaining the monomer. While at first glance such quantities appear so small as to be unimportant, it has been determined that only traces of butadiene, i.e., 5 p.p.m. or less, act to inhibit the polymerization rate of vinyl chloride significantly and because of this effect the diene cannot be tolerated in the monomer.

Accordingly, it is an object of the present invention to provide a simple commercially feasible method for purifying vinyl chloride to obtain a product essentially free from butadiene and thus eminently suitable for conversion at efficient rates to high-quality polyvinyl chloride. This and other objects and advantages of the invention which will become apparent from the following description thereof are attained by contacting the vinyl chloride containing butadiene in the vapor phase at a temperature within the range from about 25° C. to about 350° C. with cupric chloride supported on a material having a high surface area. Suitable supporting materials of high surface area for the cupric chloride include carbon, alumina, silica gel, kieselguhr, diatomaceous earth, fuller's earth, activated clay and the like. The contacting materials are easily and readily prepared by saturating the support with a solution aqueous or otherwise, of the copper chloride, and drying the impregnated support by evaporation. Further drying to remove all traces of moisture can be effected if desired by passing an inert gas such as nitrogen through the mass while it is being heated after it has been charged to the reactor.

Treatment of the vinyl chloride is best effected by passing the vapors through a fixed bed of the supported chloride. However, the monomer can also be treated by contacting it with a moving bed of supported cupric chloride or by the well known "fluidized" techniques used in catalytic processes.

While butadiene can be removed at any temperature from about 25° C. to about 350° C., the use of temperatures from 100° C. to 200° C. results in most effective and efficient purification. Pressure is not a critical variable. Preferably, the method of the invention is practiced using atmospheric pressure but either subatmospheric or superatmospheric pressures can be used so long as the vinyl chloride being treated is maintained in the vapor phase.

Contact time may vary widely depending upon the temperature employed. At higher temperatures, shorter contact times are required than at the lower temperatures. The rate of flow of the vinyl chloride over the contacting agent is readily and easily regulated so that a satisfactory removal of butadiene is effected.

The following example serves to illustrate the process of the invention but is not to be construed as limiting it in any manner whatsoever.

EXAMPLE 1

A glass tube about 10 in. long and 1½ in. in outside diameter was employed as the reactor. The reactor was immersed in an oil bath which was heated by means of a heating mantle. A portion of the inlet gas manifold connected to the bottom of the reactor formed a dip leg which was disposed within the oil bath and functioned as a preheater for the vapors being charged to the reactor. The reactor was charged with approximately 100 ml. of the cupric chloride ($CuCl_2$) contacting material and purged with nitrogen at a temperature of approximately 150° C. to remove last traces of moisture therefrom. Thereafter, the reactor temperature was regulated at the desired level and vinyl chloride vapors containing butadiene were fed through a calibrated rotameter at an approximate rate of 390 ml. per minute into the gas inlet manifold and passed through the bed of supported cupric chloride in the reactor. The effluent gas from the reactor was condensed and collected in a vented Dry Ice trap. The vinyl chloride charged and that obtained after contacting with cupric chloride were both analyzed by means of a gas chromatograph for butadiene content. Several runs were made in the foregoing manner at different temperatures. Data for these presented in the table below demonstrate conclusively that butadiene is completely and effectively removed from vinyl chloride by contacting the monomer in the vapor phase with cupric chloride supported upon a material of high surface area.

*Table I*

| Contacting Agent | Temp. °C. | Butadiene Content of Vinyl Chloride | |
|---|---|---|---|
| | | Before Treatment (p.p.m.) | After Treatment (p.p.m.) |
| $CuCl_2$ on Alumina | 75 | 205 | 91 |
| $CuCl_2$ on Carbon | 100 | 203 | 0 |
| $CuCl_2$ on Alumina | 100 | 143 | 0 |
| $CuCl_2$ on Carbon | 100 | 143 | 0 |
| $CuCl_2$ on Alumina | 150 | 205 | 0 |

What is claimed is:
1. A process for the purification of vinyl chloride containing minor amounts of butadiene which comprises contacting said vinyl chloride in the vapor state at a temperature within the range from about 25° C. to about 350° C. with cupric chloride supported upon a material having a high surface area and recovering vinyl chloride substantially free from butadiene.
2. The process of claim 1 in which the contacting is effected at a temperature in the range from about 100° C. to about 200° C.
3. The process of claim 1 wherein said material having a high surface area is carbon.
4. The process of claim 1 wherein said material having a high surface area is alumina.

References Cited in the file of this patent
UNITED STATES PATENTS
2,399,488 Hearne ---------------- Apr. 30, 1946
2,616,883 Marous ---------------- Nov. 4, 1952
2,752,402 Pye ------------------ June 26, 1956